Jan. 19, 1937.  A. K. KUSEBAUCH  2,068,334
PIPE COUPLING GASKET
Filed Feb. 2, 1935
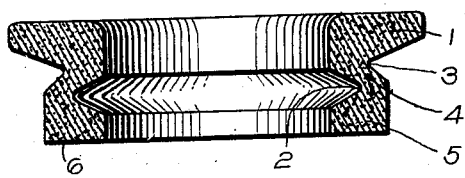
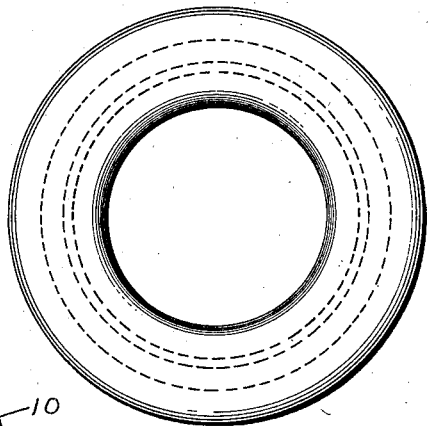
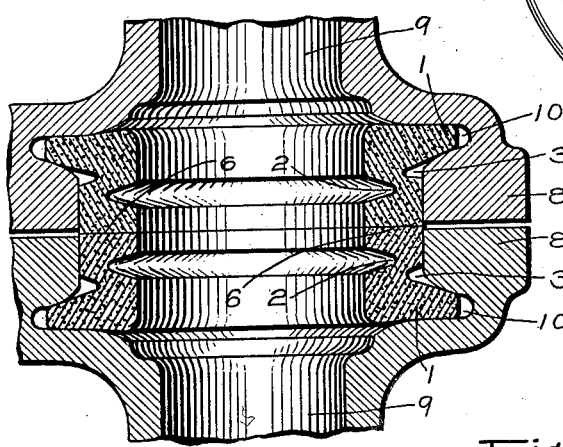
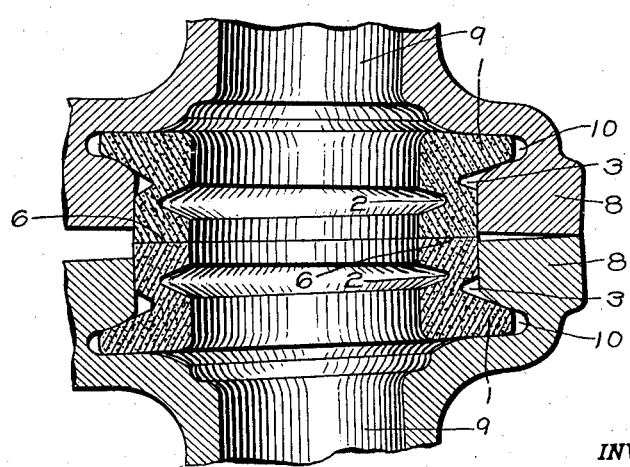
INVENTOR
ANTON K. KUSEBAUCH
BY
ATTORNEY Patented Jan. 19, 1937

2,068,334

UNITED STATES PATENT OFFICE 2,068,334

PIPE COUPLING GASKET

Anton K. Kusebauch, Bellevue, Pa., assignor to The Westinghouse Air Brake Company, Wilmerding, Pa., a corporation of Pennsylvania Application February 2, 1935, Serial No. 4,622

3 Claims. (Cl. 288—1)

This invention relates to gaskets, and more particularly to a flexible ring gasket for use in fluid pressure apparatus.

The gaskets used in counterpart couplings, particularly of the type employed between the adjacent ends of cars of a train for connecting the fluid conduits or train pipes, are liable to be subjected to a certain degree of flexing caused by relative movement or play between the connected coupling heads, such as might be produced, in the case of said train pipe couplings, while the train is rounding a curve or running over a rough road bed.

Under these conditions, leakage of fluid under pressure is apt to develop between the seating faces of the gaskets, due to their inability to maintain a seal when flexed.

One object of my invention is to provide an improved gasket capable of maintaining a seal while being flexed through a relatively wide range of obliquity, so as to obviate the above difficulty.

Another object of my invention is to provide an improved gasket adaptable for use as a valve seat in a fluid pressure apparatus, such as a trip cock device employed in a fluid pressure brake system.

In the accompanying drawing, Fig. 1 is a sectional view of a gasket constructed according to the invention; Fig. 2 is a face view of the gasket shown in Fig. 1; Fig. 3 is a fragmentary sectional view of a pair of coupling heads carrying gaskets of the type shown in Fig. 1 and coupled together, and in normal alignment; and Fig. 4 is a view similar to Fig. 3 but with the coupling heads and gaskets shown slightly out of alignment.

According to the invention, the gasket is preferably made of a resilient material, such as rubber, and as shown in Fig. 1 of the drawing, comprises a ring-like body having a substantially wedge-shaped flange portion 1, an internal annular V-shaped recess or groove 2 and an external annular V-shaped recess or groove 3 so positioned as to provide a relatively thin neck portion 4 sloping diagonally and outwardly from the inner periphery of said flange portion, and a lip portion 5 extending from the neck portion and having a seating face 6.

As shown in Figs. 3 and 4 of the drawing, coupling heads 8 are provided, adapted to be coupled by coupling means (not shown), and each coupling head having a fluid passage 9 and an internal annular recess 10, into which the flange portion 1 of the gasket is adapted to fit.

In the coupled position of the coupling heads the seating faces of each of the gaskets engage and said gaskets are compressed to provide a substantially leak-proof seal, the neck portion 4 flexing and the V-shaped grooves 2 and 3 becoming narrower to accommodate the resiliently displaced material of the gaskets. It will be noted that the outer peripheral surface of lip portion 5 of each gasket has a sliding fit in the bore at the mouth of each coupling head 8, so that the engaged sealing faces 6 are maintained parallel when said gaskets are flexed.

When fluid under pressure is supplied to the train pipe, the pressure exerted in the groove 2 of each gasket acts against the lip portion 5 and thereby tends to press the seating face 6 more tightly into engagement with that of the other gasket, while fluid pressure acting against the flange portion 1 tends to wedge said portion into tight engagement with the recess 10 of each coupling head 8, so as further to ensure against leakage of fluid under pressure past the gaskets.

It should be especially noted that the improved gasket constructed according to this invention has a stout and serviceable flange portion and may have a comparatively thick lip portion, and yet, is rendered highly flexible by means of the relatively thin, diagonally disposed neck portion which is capable of resiliently bending or collapsing due to the provision of the opposite circumferential grooves. The lip portion supported by the neck portion, being thick and having slidable engagement with the wall of the conduit opening, is therefore relatively resistant to distortion, and tends to maintain a flat sealing face while the gasket is being flexed.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A flexible ring gasket comprising an annular flange portion and a seat portion, and provided with an interior annular groove and an exterior annular groove forming a web portion connecting the flange portion with the seat portion, the web portion being narrow in extent to provide rigidity on the one hand to ensure firm seating, and flexibility on the other hand to ensure adjustment of the seating face to conform to a plane at an angle to the normal plane.

2. A flexible gasket for a hose coupling, made of resilient material and comprising an annular flange portion and a thick seat portion, and provided with an annular V-shaped groove in the outer circumferential surface of the gasket and a similar V-shaped groove disposed in the inner wall of the gasket diagonally opposite the exterior groove, forming a relatively thin and sloping web portion connecting the flange portion with the seat portion, the web portion being narrow in extent to provide rigidity on the one hand to ensure firm seating, and flexibility on the other hand to prevent distortion of the seating face.

3. A packing ring for a hose coupling comprising a member constructed of resilient material and having an annular, radially extending flange portion, the ring having a radially outwardly extending substantially V-shaped groove formed in the interior wall thereof and having a radially inwardly extending substantially V-shaped groove formed in the exterior wall thereof and disposed intermediate the groove in the interior wall and the annular radially extending flange, said grooves being separated by a relatively thin web portion, the web portion being short in extent to provide rigidity on the one hand to ensure firm seating, and flexibility on the other hand to ensure adjustment of the seating face to conform to a plane at an angle to the normal plane.

ANTON K. KUSEBAUCH.